June 30, 1964  T. E. LARKIN  3,139,573
PLURAL MOTOR SYNCHRONOUS TIE STARTING SYSTEM
Filed July 12, 1962
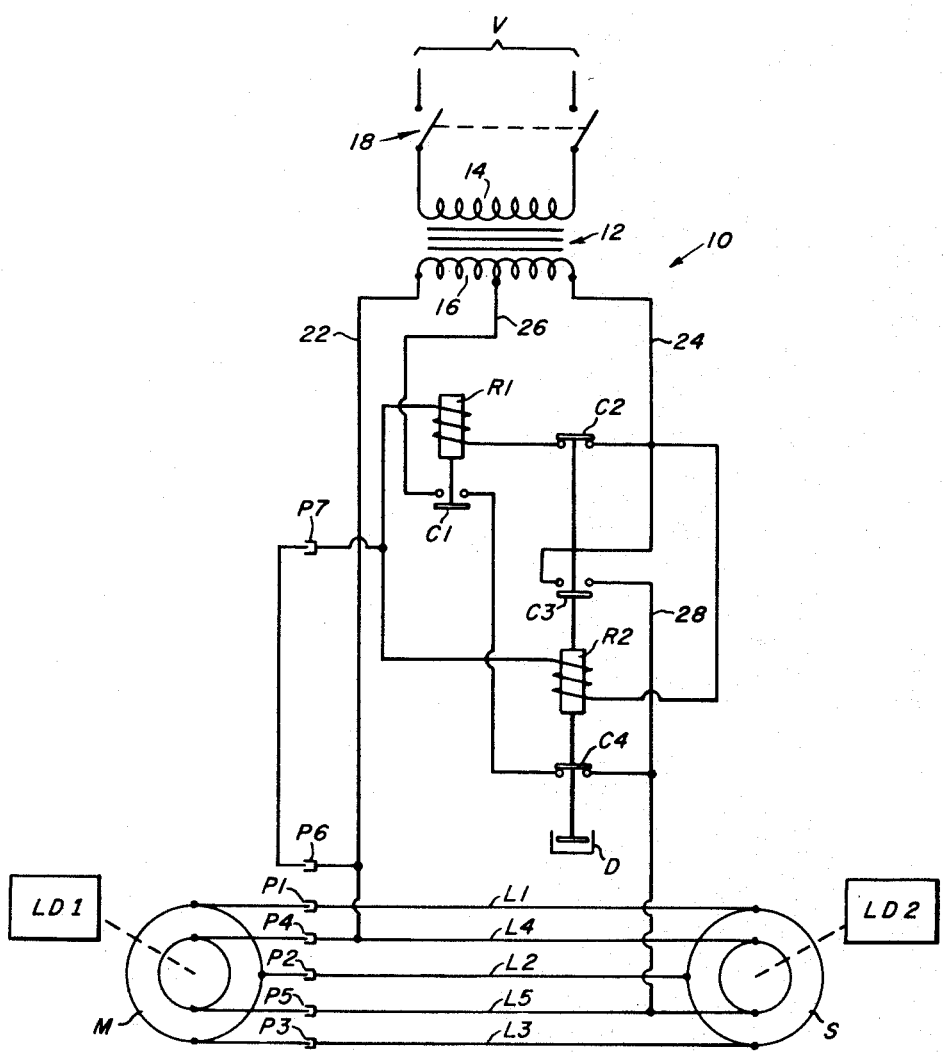
INVENTOR
THOMAS E. LARKIN
By Donald G. Dalton
Attorney 3,139,573
PLURAL MOTOR SYNCHRONOUS TIE STARTING SYSTEM
Thomas E. Larkin, Chicago, Ill., assignor to United States Steel Corporation, a corporation of New Jersey
Filed July 12, 1962, Ser. No. 209,330
3 Claims. (Cl. 318—44)

This invention relates generally to synchronizing systems and, in particular, to synchronous tie systems utilizing a master unit and a slave unit.

The use of synchronous tie systems where mechanical linkages are difficult, impossible, or expensive is a common expedient well known in the art. The rotor of a master unit is mechanically coupled to the driving load or the member which is to be followed. The master unit is electrically connected to the slave unit in such a way that the slave unit's rotor will rotate in phase with the rotor of the master unit. The electrical connection includes means for applying alternating current voltage to both of the rotors. During normal operating conditions the applied voltage must be sufficient to produce the required torque in the slave unit's rotor. In some cases frequent disconnecting and reconnecting of the slave unit and master unit is necessary. However, when the slave unit is reconnected to the master unit under full operating voltage and the slave unit's rotor is substantially out of phase with the rotor of the master unit, e.g. about 100° or more, the rotor of the slave unit may develop enough inertia to rotate past the in phase relationship with the master unit to such an extent that it will continue its rotation and act as a motor independently of the master unit, deriving its power from the power source. Such a condition is frequently referred to as "motorizing."

It is therefore a principal object of this invention to provide a synchronous tie system which prevents over-shooting of the slave unit when energized out of phase with the master unit.

A more particular object of this invention is to provide a synchronous tie system in which the rotors are initially energized on a reduced voltage and thereafter full operating voltage is applied.

Yet another more specialized object of this invention is the provision of a synchronous tie system which energizes the rotors initially at a reduced voltage when the master unit and slave unit are initially connected and applied full operating voltage after a predetermined period of time subsequent to the initial application of the reduced voltage.

Other objects and advantages of the invention will become apparent from the following description and accompanying drawing, in which:

The single figure is a circuit diagram somewhat schematic of the synchronous tie system of this invention.

Referring now to the drawing, the synchronous tie system includes a master unit M and a slave unit S. The rotor of the master unit M is shown schematically connected to the driving load LD1 and the rotor of the slave unit S is shown schematically connected to the load LD2 to be driven in phase with the driving load. The stators or fields of the master unit and slave unit are connected by conductors L1, L2, and L3. The rotors of the master unit and slave unit are connected by conductors L4 and L5. Disconnect plugs P1, P2, P3, P4 and P5 are provided in the conductors L1 through L5 respectively and are adapted to connect and disconnect the stators and rotors.

An alternating current voltage source to energize the system is shown schematically at V and is adapted to energize the rotors of the master unit and slave unit through a control system designated generally as 10. The control system 10 includes a transformer 12 having a primary winding 14 and a secondary winding 16. The primary winding 14 is connectable to the voltage source V by a double pole single throw switch 18.

A pair of conductors 22 and 24 are connected to opposite ends of the secondary winding 16 and a conductor 26 is provided at the center tap of the secondary winding 16. The voltage across the opposite ends of the winding 16 is the full operating voltage of the system, and the voltage at the center tap is about one-half full operating voltage. A relay R1 is coupled between the conductors 22 and 24 and operates a contact C1 which is normally open when the rotors are de-energized. A second relay R2 is coupled between the conductors 22 and 24 and operates contacts C2, C3 and C4. Contacts C2 and C4 are normally closed and contact C3 is normally open when the rotors are not energized. A timing delay switch D which in the disclosed embodiment takes the form of a dash pot is connected to relay R2 and delays operation of the switch for a purpose which will be described hereinafter.

The conductor 22 is connected to conductor L4 and conductor 24 is connected through contact C3 and conductor 28 to conductor L5. Disconnect plugs P6 and P7 are provided between relays R1 and R2 and conductor 22. In the preferred embodiment all of the plugs P1 through P7 are contained physically in the same housing so that they may all be connected and disconnected simultaneously in one simple operation.

*Operation*

Assuming that the disconnect plugs P1 through P7 are disconnected and the switch 18 is open no motion will be transmitted to the slave unit from the master unit even though load LD1 is driving the master unit. If it is desired to connect the slave unit to the master unit, first the switch 18 is thrown to energize the transformer 12. This will provide a voltage in conductor 22 which will be applied to conductor L4. However, contacts C1 and C3 are open and hence no voltage will be supplied to conductor L5. Since the disconnect plugs P6 and P7 are in the disconnected condition neither relay R1 nor R2 will be energized and hence, the system will not be energized. With switch 18 closed plugs P1 through P7 are engaged. This will energize relay R1 which will close contact C1. Relay R2 will also be energized but because of the time delay D the contacts will remain in their initial position for the period of time delay. The delay D is selected to give delay of approximately one to three seconds, the exact time varying depending upon the size of the slave unit and load LD2 and the time required for the slave unit to come almost into phase. As soon as the relay R1 is energized and contact C1 is closed current will flow from conductor 26 through contact C1 and contact C4 to conductor 28 then to conductor L5. Thus, conductors L4 and L5 are energized from one end tap and the center tap of the transformer which applies about one-half voltage. When this voltage is applied, the synchronous tie system will respond and the current flow in the stator circuit will start to draw the slave unit's rotor into phase. However, even if the slave unit's rotor is out of phase a substantial amount with the rotor of the master unit because of the reduced voltage a lower torque will be applied to the slave unit which will tend to bring it into phase much more slowly than if full operating voltage had been applied. This will prevent the slave unit's rotor from building up enough inertia to over-shoot out of phase with the rotor of the master unit. After this reduced voltage has been applied from one to three seconds depending upon the value of the time delay D, relay R2 will move contacts C2 and C4 into the open position and close contact C3. Opening of contact C4 disconnects the center tap of the secondary winding 16 from the conductor L5, and closing of contact C3 connects conductor 24 to conductor L5 which will provide full operating voltage to the slave unit and master unit. The opening of contact C2 will de-energize relay R1 which will open contact C1. As long as the disconnect plugs P1 through P7 are maintained connected the relay R2 will be energized and the full operating voltage will be applied to the conductors L4 and L5.

While one embodiment of my invention has been shown and described it will be apparent that other adaptations and modifications may be made without departing from the scope of the following claims.

I claim:

1. In a synchronous tie system including an alternating current master unit and an alternating current slave unit, first conductor means coupling the stators of the master unit and slave unit to form a first circuit and second conductor means coupling the rotor of the master unit to the rotor of the slave unit to form a second circuit, said second conductor means including plug means to selectively connect and disconnect said rotors, the combination therewith of an alternating current voltage source, a transformer operably connected to said voltage source and including means to deliver both a reduced voltage and a full operating voltage of said system, means to apply said reduced voltage to said second circuit when said plug means initially connect said rotors, and means including timing means to apply said full operating voltage to said second circuit a predetermined time after the reduced voltage has been initiated.

2. The combination of claim 1 wherein said reduced voltage is approximately one-half of the full operating voltage.

3. The combination of claim 2 wherein said timing means delays the application of full operating voltage from about one to three seconds after initiation of the reduced voltage.

References Cited in the file of this patent

UNITED STATES PATENTS

| | | |
|---|---|---|
| 2,179,350 | Reid | Nov. 7, 1939 |
| 2,203,854 | Andersen | June 11, 1940 |
| 2,232,255 | Myles | Feb. 18, 1941 |

FOREIGN PATENTS

| | | |
|---|---|---|
| 450,295 | Great Britain | July 14, 1936 |
| 476,174 | Great Britain | Dec. 2, 1937 |
| 1,103,456 | Germany | Mar. 30, 1961 |